Figure 1:
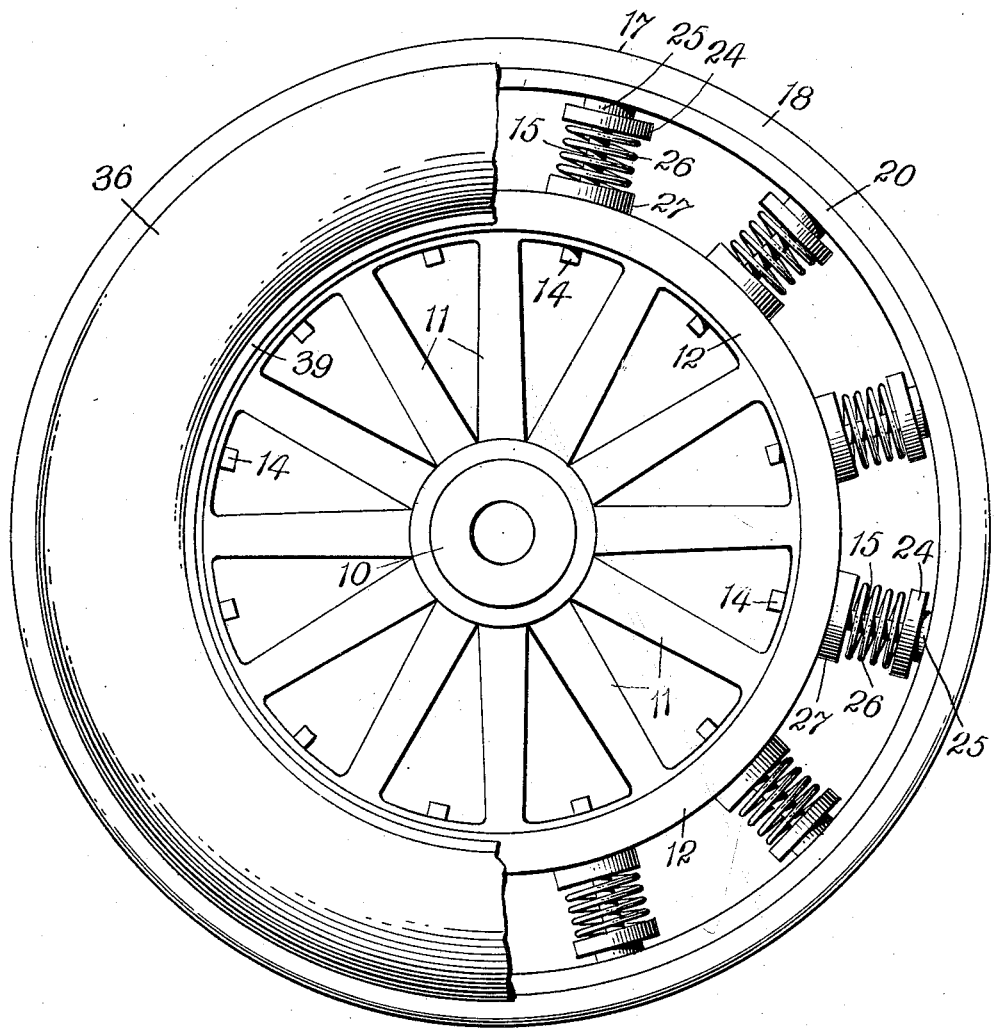

E. S. FREY.
VEHICLE WHEEL.
APPLICATION FILED NOV. 10, 1908.

982,047.

Patented Jan. 17, 1911.

2 SHEETS—SHEET 1.

WITNESSES

INVENTOR
Erwin S. Frey
BY
Criswell & Criswell
ATTORNEYS

E. S. FREY.
VEHICLE WHEEL.
APPLICATION FILED NOV. 10, 1908.
982,047.
Patented Jan. 17, 1911.
2 SHEETS—SHEET 2.
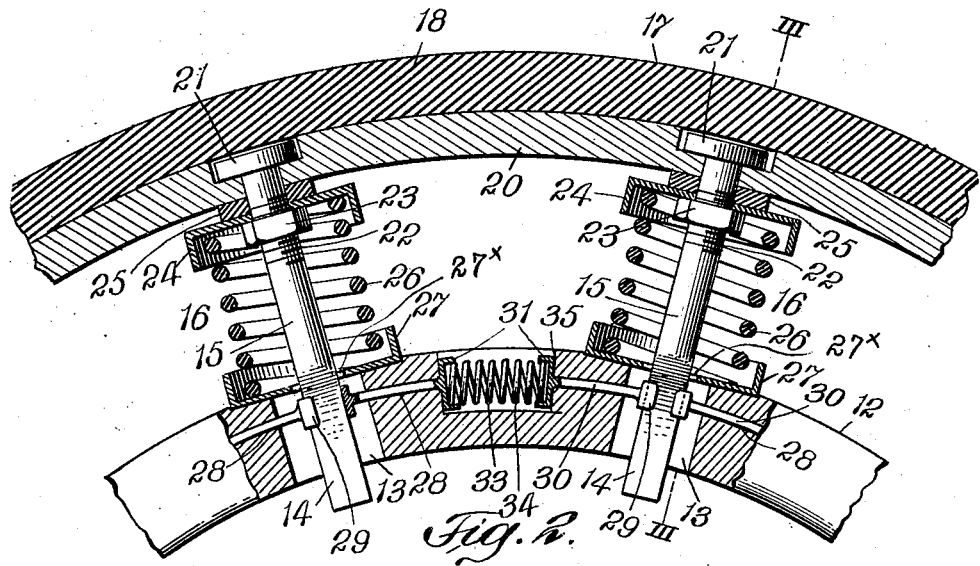
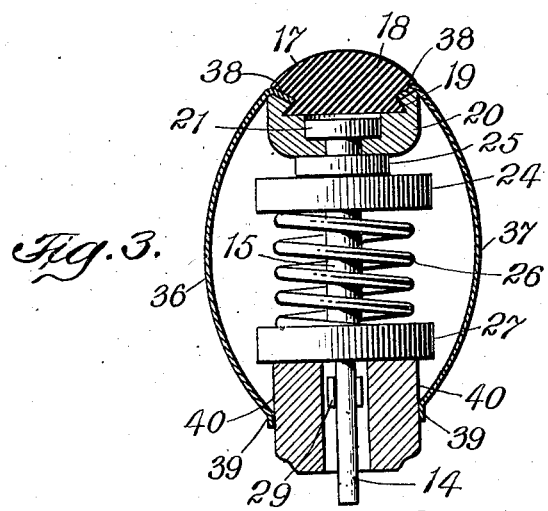
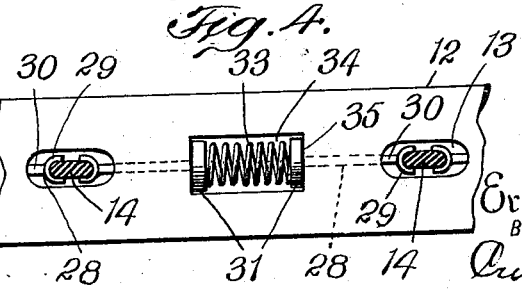
WITNESSES
INVENTOR
Erwin S. Frey
BY
ATTORNEYS

UNITED STATES PATENT OFFICE.

ERWIN S. FREY, OF NEW YORK, N. Y.

VEHICLE-WHEEL.

982,047.

Specification of Letters Patent. Patented Jan. 17, 1911.

Application filed November 10, 1908. Serial No. 461,944.

*To all whom it may concern:*

Be it known that I, ERWIN S. FREY, a citizen of the United States, and a resident of New York, borough of Brooklyn, county of Kings, and State of New York, have invented certain new and useful Improvements in Vehicle-Wheels, of which the following is a full, clear, and exact description.

This invention relates more particularly to a vehicle wheel employed in connection with automobiles.

The primary object of the invention is to provide a wheel which will dispense with the pneumatic feature thereof, and still have the resiliency of a pneumatic tire without the objections incident thereto in which the usual wheel is liable to puncture and collapse, and which forms a very expensive part of automobiles and other vehicles.
A further object of the invention is to provide simple and efficient means by which the tread of the wheel may be resiliently connected to the wheel in such a way that it will give in various directions without straining or injuriously affecting the parts holding said tread.

With these and other objects in view, the invention will be hereinafter more particularly described with reference to the accompanying drawings, which form a part of this specification, and will then be pointed out in the claims at the end of the description.

In the drawings, Figure 1 is a side elevation, partly broken away, of one form of wheel embodying my invention. Fig. 2 is an enlarged fragmentary section showing how the two relatively movable members are held together. Fig. 3 is a transverse section, partly in elevation, taken on a line III—III of Fig. 2; and Fig. 4 is a fragmentary sectional plan view.

The wheel may have the usual hub 10 from which projects radially arranged spokes 11, to which may be held in any desired way a rim, felly or inner member 12. This member 12 may be provided with radially arranged slots 13 through which project one end 14 of radially arranged rods, bolts or devices 15 forming a part of the supporting devices 16 which serve to hold the tread member 17 normally concentric with the felly or member 12. The tread member 17 may have a rubber or other wearing part 18 which is solid, and is provided with a dovetailed portion 19 which fits into an annular groove in the rim 20. This rim 20 is recessed at intervals around the surface thereof, and in the recesses are arranged the heads 21 formed on the upper end of the bolts or rods 15, and said bolts are each screwthreaded for a part of their length, as at 22, so as to be engaged by a nut 23. This nut 23 clamps a cup-shaped device or member 24 against a washer 25 which rests against the inner surface of the rim 20, and serves to rigidly hold said cup-shaped device 24 and washer as well as the bolt 15 to said rim so as to be radially arranged with respect thereto. A spring 26 has one end fitting within the cup-shaped device 24, and its other end held in the cup-shaped device 27 which is opposed to the device 24 and is held in any desired way to the outer surface of the felly or member 12. The cup-shaped device 24 moves with its bolt 15 and said bolt 15 passes through an elongated opening 27ˣ in the cup-shaped device 27 so that as the wheel rotates under load, the spring 26 will yield and give the proper resiliency to the tread member, each of said springs being of sufficient tension to properly support the tread member.

To avoid straining the rods or bolts 15 and give the proper yielding effect to the tread member, I make the slots 13 elongated, Figs. 2 and 4, so that the rods 15 may move axially or lengthwise of the felly in either direction according to the direction the wheel is rotated. The rod 15 is held normally centrally of the slot or opening 13, and engaging each of said posts or rods 15 on each side thereof is a device 28, the said lower end 14 of the rod 15 being flattened somewhat to adapt the device 28 to readily engage therewith. These devices 28 are arranged in pairs for each rod 15, and are each provided with a head 29 adapted to engage the lower part 14 of said bolt or post, and is provided with a stem portion 30 which projects through and is slidingly held in an opening in the member or felly 12. At one end of the stem 30 is a cup-shaped part 31 which is opposed to the cup-shaped part of the member or device adjacent thereto and between these two opposed cup-shaped devices is a spring 33. The spring 33 and cup-shaped devices 31 are arranged in openings 34 in the felly, and the cup-shaped parts or heads 31 normally rest against the radial walls 35. As will be seen the tread member will yield when it meets obstructions and for other reasons, and as it yields certain of the rods 15 will have to move peripherally or about the axis of the wheel. The rods 15 are permitted to move in the slots 13 axially or lengthwise thereof, and one of the devices 28 on each rod will yield by reason of the spring 34 while the devices on the opposite sides will remain stationary. In other words all of the devices on the same side of the posts or rods 15 will yield to the movement of the tread member when the wheel is rotated in one direction, while the other devices on the opposite sides of the rods will yield when the wheel is rotated in the opposite direction, thus permitting the wheel to have a proper resilient effect and serving to hold the tread member in its proper relation to the member or felly 12 and overcoming any shearing effect or injury that might be done to the rods 15.

The working parts for producing the resilient effect may be protected by annular bands or plates 36 and 37 located on opposite sides of the wheel and which provide an annular chamber for the devices 16. These plates 36 and 37 may be curved to make the tire cylindrical or they may be curved to produce the shape shown best in Fig. 3, and each plate may be provided with an inturned end 38 adapted to be inserted under the rubber tread part 18 over the member 20, and each plate has its inner part bent or formed as at 39, to slide against the marginal walls 40 of the felly 12.

From the foregoing it will be seen that a simple and efficient vehicle wheel is provided in which substantially the same effect as in a pneumatic tire may be secured; that said wheel is so constructed and has its tread portion so held that the tire may be made to have the appearance of the usual pneumatic tire, and that simple and efficient means are provided for holding the tread member yieldingly to the inner member and for properly supporting the same.

Having thus described my invention, I claim as new and desire to secure by Letters Patent:—

1. In a vehicle wheel, the combination with an inner member and an outer tread member, of means for connecting the tread member yieldingly to the inner member and including a plurality of rods, said inner member having elongated openings for said rods, devices extending from opposite sides of each rod loosely mounted in said inner member comprising a head portion engaging a part of said rod, a stem portion slidingly held in the inner member and a cup-shaped portion at the opposite end of said stem, and springs interposed between the opposed cup-shaped ends of said devices.

2. In a vehicle wheel, the combination with an inner member and an outer tread member, of means for supporting the tread member yieldingly to the inner member, devices extending from opposite sides of each tread supporting means loosely mounted in said inner member comprising a head portion engaging a part of said tread supporting means, a stem portion slidingly held in the inner member and a cup-shaped portion at the opposite end of said stem, and springs interposed between the opposed cup-shaped ends of said devices.

This specification signed and witnessed this 7th day of November A. D. 1908.

ERWIN S. FREY.

Witnesses:
W. A. TOWNER, Jr.,
E. KRANCER.